United States Patent [19]
Häfeli

[11] 4,031,192
[45] June 21, 1977

[54] METHOD OF HYGIENIC DISPOSAL OF CHLORINE-CONTAINING PLASTIC MATERIAL

[75] Inventor: Robert J. Häfeli, Zurich, Switzerland

[73] Assignee: Von Roll AG, Gerlafingen, Switzerland

[22] Filed: Aug. 27, 1975

[21] Appl. No.: 608,281

[30] Foreign Application Priority Data

Sept. 5, 1974 Switzerland .............. 12060/74

[52] U.S. Cl. .......................... 423/488; 423/481; 423/659; 23/262
[51] Int. Cl.[2] ............................. C01B 7/08
[58] Field of Search .............. 423/481, 488, 659 R

[56] References Cited
UNITED STATES PATENTS

| | | | |
|---|---|---|---|
| 2,196,246 | 4/1940 | Brown et al. ............... | 423/488 |
| 3,220,798 | 11/1965 | Cull et al. ............... | 423/488 X |
| 3,394,056 | 7/1968 | Nadler et al. ............... | 423/481 X |
| 3,445,192 | 5/1969 | Woodland et al. ............ | 423/481 X |
| 3,716,339 | 2/1973 | Shigaki et al. ............ | 423/488 |
| 3,829,558 | 8/1974 | Banks et al. ............... | 423/481 |
| 3,933,989 | 1/1976 | Itoh et al. ............... | 423/488 X |

*Primary Examiner*—Edward Stern
*Attorney, Agent, or Firm*—Flynn & Frishauf

[57] ABSTRACT

To dispose of high-polymer, chlorine-containing plastics, such as PVC, without liberating hydrochloric acid in the atmosphere, the material is placed in a closed vessel and contacted with super-heated steam to split off gaseous hydrochloric acid; the resulting mixture of water vapor, steam and hydrochloric acid is removed, cooled and condensed, so that hydrochloric acid can be derived therefrom; the residue of the material after the hydrochloric acid has been removed can then be safely incinerated with other refuse, etc.

8 Claims, 2 Drawing Figures

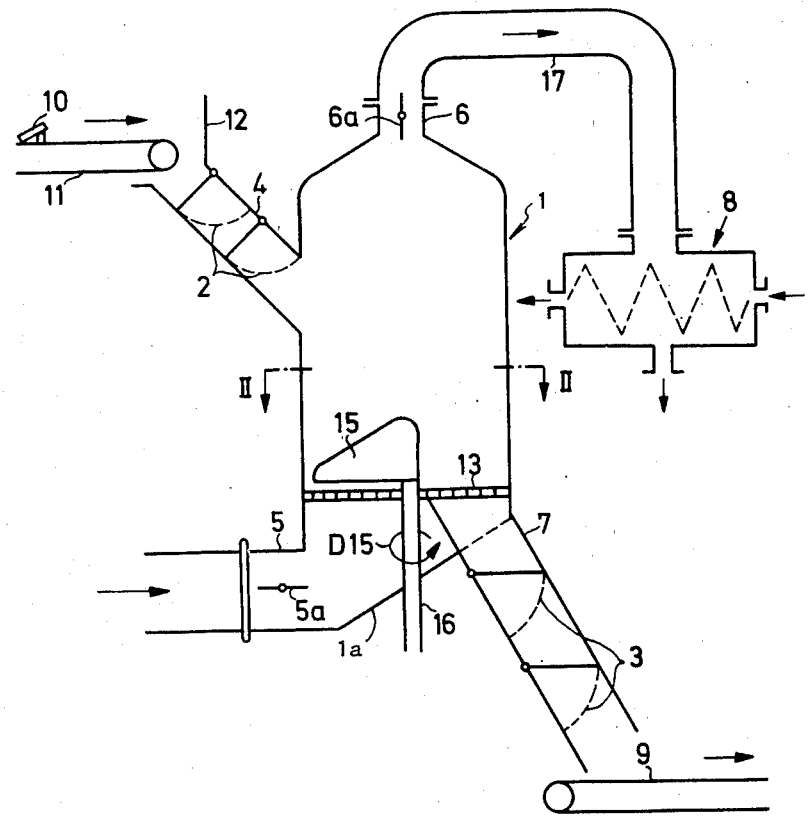

METHOD OF HYGIENIC DISPOSAL OF CHLORINE-CONTAINING PLASTIC MATERIAL

The present invention relates to a method to hygienically dispose of trash which includes chlorine-containing, high-polymer plastic substances.

Clean, unpolluted air is becoming more and more important for the industrialized world. Clean air is a basic requirement for maintenance of life in general, for man, beast and plant. The human body is generally quite resistant to deleterious influences of the outside world; long-term effects on basic health, however, cannot be predicted, particularly the effect of persistent inhalation of polluted air, or the cumulative effect resulting from such inhalation; later consequences cannot be foreseen at all. One may refer, for example, only to the influence on genes due to even weak radioactive radiation. Certain plants are extremely sensitive with respect to contaminants in the air, such as sulphur dioxide being emitted from industrial installations, fluor from aluminum smelters, and the like.

The general contaminants found in the air in industrial countries include carbon monoxide, carbon dioxide, sulphur dioxide, nitrogen dioxide and, in general, $NO_x$ compounds, aldehydes, ammonia, and the like; in addition to those contaminants, increasing amounts of hydrochloric acid (H Cl) have been determined. It has previously been possible to prove the presence of H Cl in the exhaust gases from fires; the emission of this contaminant together with the exhaust gases in the free atmosphere, particularly upon combustion of municipal refuse has increased considerably. It is believed that the substantial increase in H Cl in the exhaust gases from incinerators is due to the substantial use of polyvinylchloride (PVC) and other chlorine-containing plastics. These are used principally in the packaging industry. The consumption of PVC has substantially increased lately, and it is believed will continue to increase, since PVC is simple and inexpensive to make, and is versatile in use.

Monomer vinylchloride is simply made by associating H Cl as a non-saturated hydrocarbon with acetylene ($C_2H_2$) in the presence of suitable catalysts, according to relationship (1), reproduced on the drawing sheet of this specification. Theoretically, 1 Mol vinylchloride has approximately 56.8% chlorine or about 58.4% H Cl, that is, a substantial proportion of hydrochloric acid gas. Modern packaging materials are usually used only once, that is, they are used as throw-away packages and discarded together with other trash and refuse in the garbage pail. Some industries have substantial waste products including chlorine-containing plastics, particularly in the plastics manufacturing industry. All these plastic waste or refuse or trash substances could be deposited somewhere; when used as soil deposit, that is, in land fill operations, they will not deteriorate or decompose in the soil, however, since they are not bio-degradable. Bio-degradability of these substances could not be observed to date. Thus, one will find refuse or trash components of these plastics even after decades, uncorroded, and not decomposed; thus, merely depositing or placing such trash or refuse will require ever increasing space and refuse disposal fields. No one can determine the effects of such deposits on the soil, and on the ground water, and water table. Combustion of such substances is, therefore, to date the only possibility to completely and hygienically dispose thereof.

It has been proposed to re-cycle the various substances and compounds contained in refuse or trash. It is not economically feasible to do so, however, when municipal garbage is to be disposed of since the labor in sorting refuse or trash into its constituent compounds is excessive and, additionally, resale of re-cycled substances is difficult since an assured source of supply for specific items cannot be guaranteed to purchasers.

Ordinary municipal refuse incineration, under current conditions, is used to burn all refuse or trash, including plastics and also including compounds used in the packaging industry, typically PVC. These substances, thus, are incinerated together with the normal refuse. Some of the plastic-using industry even supplies at least a portion of is waste products to municipal incineration plants. Combusting industrial chlorine-containing plastics, typically PVC scraps or waste, has further increased the H Cl content of incinerator exhaust gases. The result is a questionable air quality, which can readily be demonstrated as follows:

Let it be assumed that one ton of municipal refuse includes 1 kg. PVC. 5000 $Nm^3$ air are required, approximately, to incinerate 1 ton of refuse, resulting again in about 5000 $Nm^3$ dry exhaust gases. 1 kg PVC — assuming a mol weight of 62.5 of the monomer substance — in about 360 liters H Cl under the normal conditions present usually in the exhaust gases of the incinerator. If, however, 100 kg PVC are present in one ton of refuse — about 10% by weight — then 36000 liters of gaseous, 100% hydrochloric acid per ton of refuse will result, that is, about 36 $Nm^3$. It is evident that such a concentration of H Cl in the exhaust gases from incinerators raises serious questions.

Plastic packaging articles made essentially of PVC are made in the form of foil, boxes, bottles, large buckets, and the like, used for packaging, for example, soaps, detergents, and the like. These packages are widely used in industrial societies; due to the relatively great volume of highly toxic hydrochloric acid gas, which is liberated into free atmosphere upon combustion thereof, may already today result in a dangerous threat to mankind and all living things on earth — animals as well as vegetation. The matter is even more serious since little is known about the long-term, or delayed effect on health both to mankind as well as to animals and plants due to the combination of hydrochloric acid gas with other contaminants in the air.

It is an object of the present invention to provide for hygienic disposition of chlorine-containing high-polymer plastic substances, that is, to essentially prevent polluting atmosphere upon refuse disposal of such substances.

SUBJECT MATTER OF THE PRESENT INVENTION

Briefly, chlorine-containing plastic materials are thermally treated with super-heated vapor, or steam; gaseous hydrochloric acid is thereby split off therefrom, and removed, together with the vapor or steam. The vapor or steam, and the split-off hydrochloric acid are cooled and condensed. The rest substances which remain after the thermal treatment will be practically free of chlorine, and can then be incinerated.

Apparatus, in accordance with the invention subject to a divisional application and to carry out the method, comprises a gas-tight, closed vessel or container having separate inlets for chlorine-containing plastic substances and super-heated water vapor, as well as separate outlets for a mixture of water vapor and hydrochloric acid gas on the one hand, and for the residues which are practically chlorine free, on the other. A gas cooling apparatus is connected to the gas-vapor or steam mixture outlet; an incinerator apparatus is connected to the residue outlet.

The invention will be described by way of example with reference to the accompanying drawings, wherein:

FIG. 1 is a highly schematic vertical cross-sectional view through an apparatus in accordance with the invention, which also will be used in connection with the explanation of the method; and FIG. 2 is a schematic cross-sectional view along line II—II of FIG. 1.

A gas-tight closable vessel or container 1 is formed with an inlet 4 for substances such as trash, refuse and the like, which contains chlorine-containing high polymers; a separate inlet 5 is provided to supply super-heated steam for thermal treatment of the refuse substances introduced through the other inlet 4. The vessel 1 has two separate outlets 6, 7. Outlet 6 removes the gas and vapor mixture formed of water vapor, steam, and hydrochloric acid gas; outlet 7 is used for the residue which will be practically of chlorine.

The inlet 4 for the chlorine-containing plastic substances and the outlet 7 for the residue can be closed off to be gas-tight by gas locks 2, 3, respectively. A gas cooler or condenser 8 is connected to the outlet 6 for the steam-vapor hydrochloric acid mixture. The practically chlorine-free residues after treatment are guided through outlet 7 on an incinerating grate 9. The chlorine-containing articles 10, principally and typically PVC, are supplied to the inlet 4 by a conveyor 11 which supplies the articles through an inlet funnel 12, as separate batch charges. The bottom of the vessel 1 is a grate 13, located essentially horizontally, and of such mesh size that it will retain the smallest elements of the charge of any one batch, while permitting application of super-heated steam through inlet 5. The bottom grate 13 is formed with a lateral opening 14 (see FIG. 2) which is separate and out of communication with the portion 1a of the vessel 1 which communicates with the steam inlet 5 and which is located beneath the bottom grate 13. A clearing vane 15, rotatable by means of a vertical shaft 16 which passes through the grate 13 is provided to move the treated charge of trash or refuse, principally PVC substances into the outlet opening 14 after the treatment with steam is finished. The vane 15 rotates in the direction of the arrow D15, and upon rotation sweeps the charge into outlet 7 for subsequent incineration on incinerator grate 9. The trap lock 2 is opened only to place a new charge into the container 1; the trap lock 3 is opened later only to remove the residue after treatment of the charge. During treatment of a PVC charge in container 1, the traps 2, 3 are closed and seal the container 1 effectively gas-tight with respect to the inlet 4 and the outlet 7, respectively. Super-heated steam can thus be supplied to the vessel 1 essentially without losses of steam to act, and affect the charge in the vessel 1. The steam inlet 5, as well as the gas-vapor steam mixture outlet 6, preferably have a control flap valve 5a, 6a, respectively located in the respective steam, or steam-gas mixture duct, although this is not strictly necessary for both, or either of the ducts. Any other control element system or device may be used. The particular control element will usually depend on the specific type and construction of the thermal treatment vessel, and the method employed.

The hydrochloric acid gas — water vapor (or steam) mixture which results upon treatment is removed from the vessel 1 from outlet 6 through duct 17, to be introduced into a gas cooler 8, for cooling and condensation. Technical concentrated hydrochloric acid can be obtained from the condenser 8 by distillation of the resulting preferably hydrochloric acid solution which will be at a concentration of less than 20, 24%. Thermal treatment of trash and refuse substances, typically, plastics, and containing chlorine, is carried out in a batch process, that is, non-continuously. The process is carried out effectively at atmospheric pressure; slightly over-pressure with respect to atmospheric pressure may be maintained in the vessel 1 in order to prevent possible penetration of cooler surrounding atmosphere due to possible leaks. Such slightly steam over-pressure, which also contributes to transport of the gas-vapor mixture through pipe 17 to condenser 8 contributes to the pressure differential causing an underpressure resulting from the condensation in cooler 8. The slight over-pressure, or pressure differentials can be obtained by suitable selection of the cross-sectional areas of the supply line 5 for the steam with respect to the gas-vapor steam removal line 17. A slight vessel over-pressure can also be obtained by suitable adjustment of at least one of the valve or control elements 5a, 6a. The primary characteristics of the super-heated steam being supplied, however, is the volume of the super-heated steam as well as its temperature; volume and temperature of the steam control the thermal treatment of the plastic products or substances in vessel 1; steam pressure is of subordinate consequence.

Thermal treatment of PVC first results in liberation of hydrochloric acid gas; thereafter, thermal depolymerization begins. The PVC is treated with super-heated steam so that hydrochloric acid gas which is split off will not be liberated to the atmosphere; rather, the hydrochloric acid gas which is split off is condensed with the steam to a hydrochloric acid solution. The acid which is thus obtained is a saleable item and can be re-sold as technical hydrochloric acid.

The quantity of the super-heated steam supplied to the vessel 1 is selected, in relationship to the H Cl gas which is split off such that the gas mixture-condensate results in a liquid hydrochloric acid solution which, at its maximum, corresponds to a concentration of 20.24%. The condensate which is obtained from the hydrochloric acid-vapor mixture therefore should provide an acid solution which is more diluted than 20.24%, that is, which at the most has a concentration of 20.24%.

The temperature of the superheated steam supplied to the vessel 1 is preferably in the range of from 200° to 500° C. The higher the temperature for thermal separation of hydrochloric acid from chlorine containing material in the vessel 1, the less the volume of the steam required for the thermal treatment. If the quantity of steam is low, cooling or additional solution water may be added to the steam — H Cl mixture in cooler 8, so that, directly, an H Cl solution is obtained having the desired concentration. The cooler 8 may, for example, be constructed as an absorption tower, in which cooling and additional solution water is added. This also reduces the size of the additional cooler 8. The condition of the steam above the gas outlet 6 of the acid gas — steam mixture depends on the operating conditions of the process; thus, the steam may be only slightly super-heated, or not super-heated at all anymore (that is, may be saturated). The principle of the process, just as steam pressure, is not materially affected by the condition of the steam in outlet 6 and therebeyond.

The residues applied to the incinerating grate 9 are practically free of chlorine and can be incinerated without special treatment of the incinerating gases, since the incinerating smoke or gases will not contain any material content of hydrochloric acid gas. The incinerating gases can then be cooled, cleaned and conducted to free atmosphere. The incinerating grate 9 may, therefore, incinerate not only the residues from vessel 1, but may also be used for incineration of customary refuse, such as municipal refuse, and may form the incinerating grate of a normal, ordinary refuse incinerator.

The clearing vane 15 is preferably a curved element (see FIG. 2) which, upon rotation in accordance with arrow D15 sweeps the residues, practically free of chlorine after treatment, into the trap opening 14. The clearing vane 15 can be operated automatically, after opening of the gas trap 3, by an electric sequence control. For best effect, the clearance vane preferably operates through two complete revolutions, starting from a start position, similar, for example, to the position of FIG. 2 or somewhat rearwardly thereof. After clearing, trap 3 is closed again.

The process has been described in connection with batch processing, but it is also possible to carry it out continuously. Rather than using a combustion grate 9, for the residues, a rotary incinerating arrangement may be used. Certain types of plastics can be treated thermally under substantial over-pressure, that is, similar to treatment in an autoclave-type vessel. Various other changes and modifications may be made; for example the clearing vane 15 may oscillate back and forth, rather than rotating in one direction only. The method, as well as the apparatus, have been described in connection with one embodiment, the details of which may be varied, as desired, within the scope of the invention.

The process permits substantial decrease of hydrochloric acid in ambient air, and hence the danger to mankind, fauna and flora on this planet. Emission of hydrochloric acid into free atmosphere is effectively inhibited while still destroying trash, refuse or waste articles made of chlorine-containing plastics. The process has the additional advantage that deposition and burying of chlorine-containing plastics, which are questionable practices when considered ecologically, can be avoided, while still resulting in disposal of these articles and substances. Additionally, the hydrochloric acid which results upon practicing of the invention can be arranged to be technical concentrated hydrochloric acid which is used in increasing quantities in industry; this hydrochloric acid can be derived, in turn, from the increasing quantities of PVC waste, scrap and trash.

I claim:

1. Method of hygienic disposal of scrap, waste, or refuse of high-polymer, chlorine-containing plastic material utilizing the steps of thermally treating the material in a closed vessel to thereby split off gaseous hydrochloric acid from said material and incinerating the essentially-free residue of the material remaining after the hydrochloric acid has been removed
    comprising, in accordance with the invention, the steps of
    placing the material on a steam pervious support in a closed vessel;
    introducing super-heated steam from below said support through said support and through said material thereon to effect said thermal treatment step, said thermal treatment step comprising hydrolytically-thermally splitting off hydrochloric acid gas by thermally treating the chlorine-containing plastic material directly with super-heated steam by direct contact of said super-heated steam with said material in said vessel,
    said super-heated steam forming a carrier gas for evolving gaseous hydrochloric acid being split off from the plastic material during said treatment;
    removing the mixture of water, water-vapor and split-off gaseous hydrochloric acid from above the upper surface of said material on said support and evolving during said hydrolytic-thermal splitting step;
    cooling and condensing said mixture of steam, water-vapor and split-off gas hydrochloric acid;
    and wherein the step of introducing said superheated steam includes controlling the quantity of super-heated steam supplied to said material in relation to said material and to the evolved hydrochloric acid gas which is split-off to result in gas-vapor mixture which, after the cooling and condensing step, has a maximum acid concentration of hydrochloric acid of 20.24%.

2. Method according to claim 1, wherein the super-heated steam for the thermal treatment has a temperature in the range of about 200° to 500° C.

3. Method according to claim 1, wherein the step of thermally treating the material in said closed vessel is carried out at approximately ambient air pressure.

4. Method according to 1, comprising the steps of providing said vessel; filling said vessel with a batch of said material; introducing said super-heated steam and removing said mixture of steam and split-off hydrochloric acid during said step of introduction of superheated steam; and then removing the then essentially chlorine-free residue as a batch.

5. Method according to claim 1, wherein said process steps of thermally treating the material, removing said resulting mixture, cooling and condensing said mixture, and incinerating the residue as carried out in a continuous process.

6. Method according to claim 1, wherein the step of incinerating the then essentially chlorine-free residue comprises incinerating said residue as a portion of other refuse to be incinerated, which other refuse is practically free of chlorine-containing components.

7. Method according to claim 1, wherein the vessel is a vessel which is sealed except for a connection for the entry of steam and for removal of said mixture, and said thermal treatment step is carried out under conditions preventing escape of said mixture, or any gases emanating from said material to ambient atmosphere.

8. Method according to claim 1, further comprising the step of distilling the cooled and condensed mixture to obtain a concentrated hydrochloric acid.

* * * * *